Jan. 4, 1966    W. J. FLAJOLE    3,226,890
HOUSE TRAILER HAVING EXPANSIBLE ROOM
Filed May 24, 1962    2 Sheets-Sheet 1
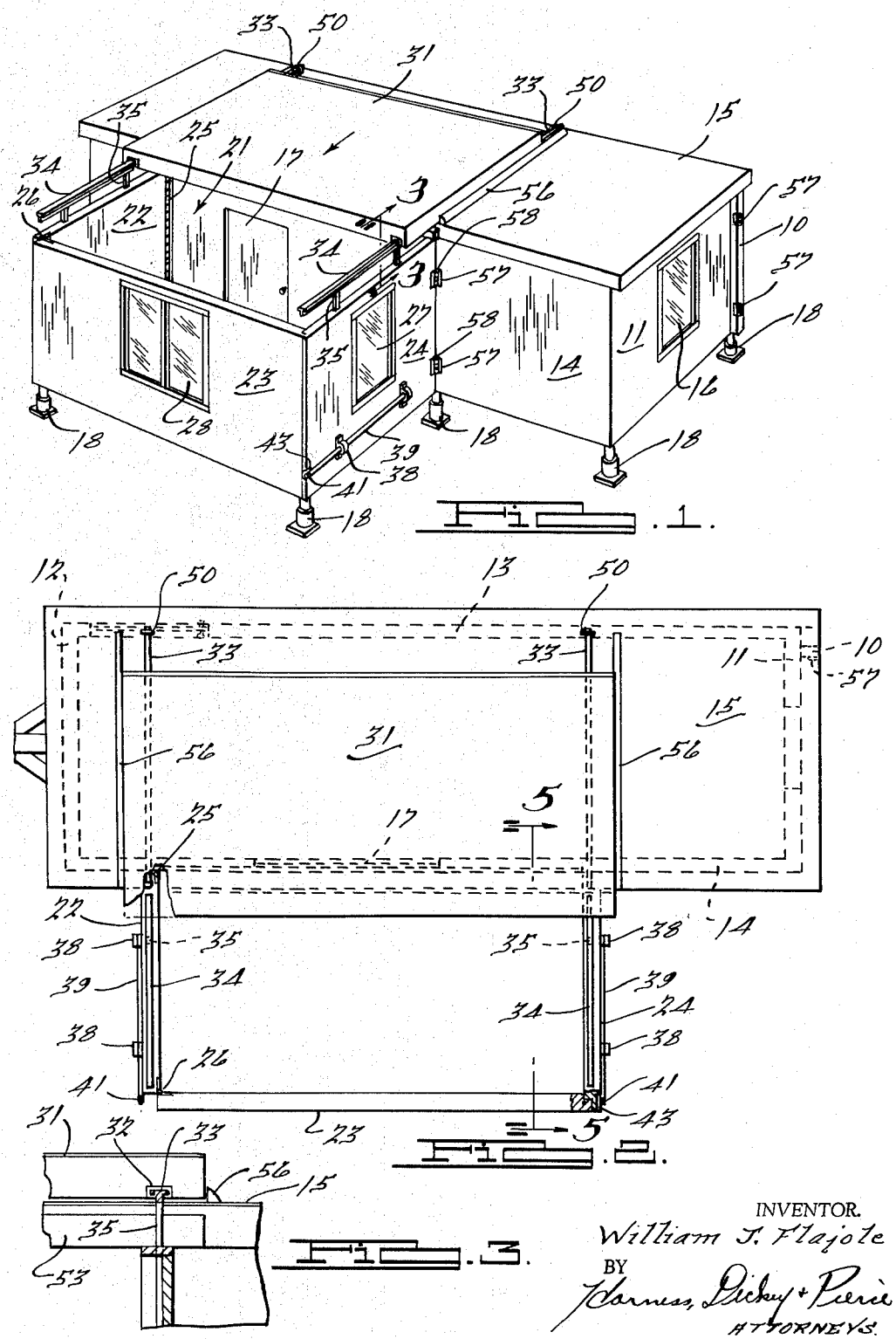
INVENTOR.
William J. Flajole
BY
Harness, Dickey & Pierce
ATTORNEYS.

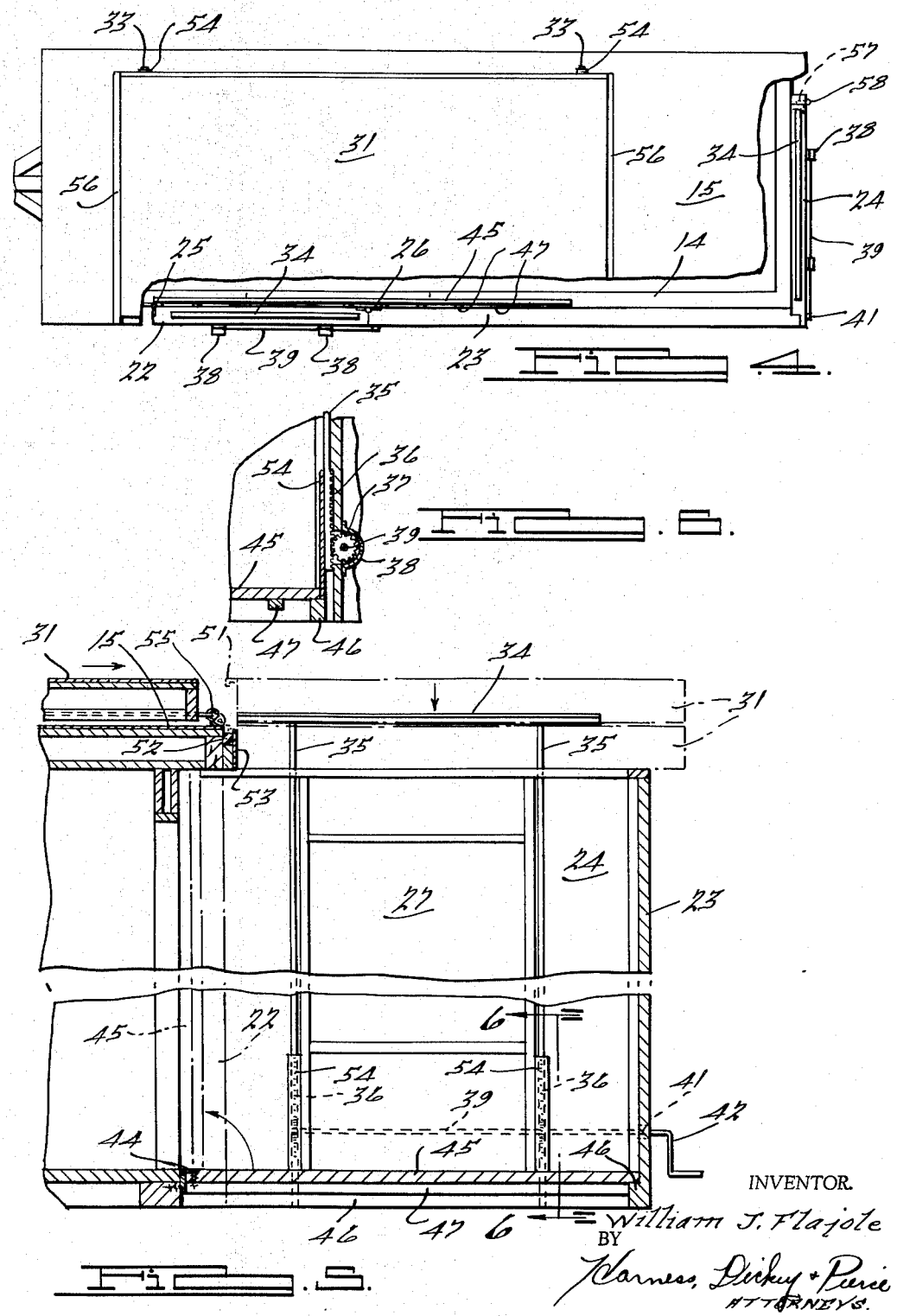

United States Patent Office 3,226,890
Patented Jan. 4, 1966

3,226,890
HOUSE TRAILER HAVING EXPANSIBLE ROOM
William J. Flajole, 20650 Breezewood, Southfield Township, Oakland County, Mich.
Filed May 24, 1962, Ser. No. 197,492
4 Claims. (Cl. 52—66)

This invention relates to trailers, and particularly to a house trailer having panels which may be moved outwardly to form an additional room.

Trailers have been progressively becoming larger and more luxurious and are being employed as a home for the owner or occupant. The trailer is often moved into a location and placed on blocks for a stay of considerable time, usually as long as work continues on a job which brought the occupant to the particular territory. This may be for only a few months; again it may be for a few years. In any case, to be more comfortable it is desirable to expand the provided quarters, and the home trailer of the present invention has a roof panel which may be slid outwardly over a room formed by hinged side sections which are supported upon one side and the rear wall of the trailer. A floor panel is pivoted to a bottom side edge of the trailer and hingedly moveable downwardly to cover the area within the walls to form the floor of the additional room. The room is covered by a roof panel when mating tracks are raised to be aligned with the tracks upon which the roof panel is secured. The roof panel is moved laterally onto the raised rails and to a position over the room and thereafter lowered to position on top of the walls. The adjacent edges of the roof panels are sealed by a downwardly extended flange on the shiftable panel which projects into a trough at the fixed roof panel edge. The trough has a thick layer of resilient material, such as foam rubber, into which the flange extends to form a permanent seal and a drain for water which may collect from the roof panels. When it is desired to move the trailer, it is only necessary to raise the rails into aligned relation to the supporting rails on the roof of the trailer and slide the roof panel thereonto. Thereafter, the supporting rails are lowered, the floor panel is hinged upwardly against the adjacent side wall of the trailer, and the side and end panels of the room are swung into position along the side and end wall of the trailer where they are secured in carrying position. Windows in the room walls may be aligned with windows in the trailer wall so that the trailer may be maintained unsable when moving from stop to stop without the necessity of setting up the room to have light within the trailer.

Accordingly, the main objects of the invention are: to provide a trailer with hinged panels along one side and the rear wall which swing outwardly into rectangular relation to a side wall of the trailer and are reinforced by a floor panel which drops downwardly upon supports at the bottom of the panel; to provide hinged panels on a trailer which are movable outwardly into rectangular relation with the end walls containing vertically movable rails which are aligned with the rails supporting a roof panel which slides thereover to a position above the rectangular walls where it is lowered upon the lowering of the rails; to provide the edge of the roof panel with the downwardly projecting flange and the edge of the trailer roof with a trough containing resilient material which seals the flange when moved therein against the passage of water and air to the interior of the room, and, in general, to provide a house trailer with means for forming an extra room which is simple in construction, readily moved into usable position, and which is economical of manufacture.

Other objects and features of novelty of the invention will be specifically pointed out or will become apparent when referring, for a better understanding of the invention, to the following description taken in conjunction with the accompanying drawings, wherein:

FIGURE 1 is a perspective view of a house trailer mounted on jacks with an extra room at one side thereof, embodying features of the present invention;

FIG. 2 is a plan view of the structure illustrated in FIG. 1;

FIG. 3 is an enlarged sectional view of the structure illustrated in FIG. 1, taken on the line 3—3 thereof;

FIG. 4 is a plan view of the trailer illustrated in FIG. 1, when in carrying position;

FIG. 5 is a sectional view of the structure illustrated in FIG. 2, taken on the line 5—5 thereof, and FIG. 6 is a broken sectional view of the structure illustrated in FIG. 5, taken on the line 6—6 thereof.

The house trailer of the present invention comprises a main structure 10 having a rear wall 11, a front wall 12, and side walls 13 and 14. The walls support a roof 15, and windows and doors are provided in various walls, such as window 16 in the rear wall 11 and a door 17 in the side wall 14. The trailer is carried on wheels near the center thereof in a conventional manner (not herein illustrated). The trailer is illustrated as being mounted on a plurality of jacks 18, and it is to be understood that a more permanent foundation may be employed, as is sometimes practiced in the art.

As more clearly illustrated in FIG. 1, the side 14 of the house trailer has a room 21 added thereto, the room being formed by an end panel 22, a side wall panel 23, and an end wall panel 24. The end panel 22 is secured by a hinge 25 to the wall 14 so as to fold flat thereagainst, as illustrated more clearly in FIG. 4. The panel 23 is secured by a hinge 26 to the panel 22 in a manner to have it disposed in extension thereof when stored against the wall 14, as illustrated in FIG. 4. The end panel 24 is permanently fixed to the panel 23 and moves against the end wall 11 of the house trailer when the panel 23 is moved to stored position. A window 27 may be mounted within the panel 24 to be aligned with the window 16 in the panel 11 of the house trailer. A window 28 is provided in the panel 23 and this may be aligned with a similar window placed in the wall 14 of the house trailer when the walls are disposed in abutted relation.

A roof panel 31 has channel-shaped slide elements 32 therein which encompass a T-track 33 which anchors the roof panel to the trailer roof and permits it to be slid therefrom. A similar T-track 34 is carried upon vertically disposed rods 35 in each of the end panels 22 and 24 of the room 21. The rods 35 have rack teeth 36 which are engaged by the teeth of a gear 37 encased within a housing 38. The pair of gears on each wall are mounted on a shaft 39 having a square end 41 to which the square recess in the head of a removable handle 42 is engageable. The wall 24 may be provided with a recess 43 to receive the socket of the handle 42.

After the panels 22, 23 and 24 have been moved to the position illustrated in FIG. 1, a floor panel 45, which is secured by hinges 44 to the lower portion of the trailer wall 14, is dropped from raised position against the wall onto the top of rails 46 which extend inwardly at the bottom of the room panels. The floor panel may be reinforced by rails 47 which are secured thereto and rest in notches in the rails 46. Thereafter, the handle 42 is employed to rotate the shafts 39 and the gears 37 to raise the rods 35 and the T-shaped rails 34 into alignment with the rails 33 which are secured to the top of the roof 15 of the house trailer. Thereafter, the roof panel 31 is slid from the rails 33 to the rails 34 beyond the roof 15, as illustrated in FIG. 5. Thereafter, the shafts 39 are rotated in the opposite direction to lower the rails 34 and the roof panel onto the top of the panels 22, 23 and 24.

A downwardly extending flange 51 at the edge of the roof panel 31 engages a rubber sealing element 52, which may be of foam rubber or other readily compressible material which forms a trough with a plate 53, as illustrated in FIG. 5. This completely seals the roof panel and prevents water, snow and wind from passing below the edge into the room.

Metal plates 54 back up the rods 35 on the side thereof opposite to that having the teeth 36 for maintaining the teeth in meshed relation with the teeth of the gears 37. The rails 33 have stop elements 50 at the end thereof above the wall 13 and suitable means, such as a lock 55, may be employed in the opposite end of the rails 33 for preventing the removal of the roof panel 31 accidentally or otherwise when the rail 34 is not aligned with the rail 33.

A triangular-shaped strip of material 56 is secured transversely of the roof 15 at each end of the roof panel 31 to prevent the air from passing thereunder when the house trailer is being transported. Hingelike elements 57 are secured adjacent to the edge of the panel 24 in position to have the sleeves thereof engage sleeves of similar elements 57 on the wall 14 so that a pintle 58 may be dropped into the aligned sleeves to secure the panels 24 and 14 in fixed relation to each other. Similar hingelike elements 57 are secured to the trailer panel 11 in position to engage those of the panel 24 when in nested position with the panel 11 and secured by pintles 58 which lock the panel 24 to the panel 11.

When the room 21 is to be disassembled, the handle 42 is employed to raise the roof panel 31, with the rails 34 aligned with the rail 33 so that the panel may be pushed from the rails 34 onto the rails 33 in carrying position. Thereafter, the rails 34 are lowered and the floor panel 45 is moved to raised position. The panel 23 is moved rearwardly to have the panel 22 engage the wall 14 of the house trailer and the panel 24 swung around the panel 11 to the position illustrated in FIG. 4. The locks 55 or other securing means for the roof panel are then secured in position, and the trailer, in so far as the wall panels 22, 23 and 24 and the roof panel 31 of the room are concerned, is ready for transportation.

What is claimed is:

1. In a house trailer comprising at least one side wall, a first trailer end wall disposed at right angles to one end of said side wall and a roof fixedly secured to the top of said walls, an outlying room having a side wall and substantially equal length first and second room end walls, hinge means securing one vertical edge of the first room end wall to a side wall of the trailer, hinge means securing the other vertical edge of the first room end wall to one vertical edge of the room side wall, the other end of the room side wall being rigidly connected to one edge of the second room end wall in substantially right angular relation thereto, and means on the free vertical edge of the second room end wall releasably securing said end wall to the trailer side wall when said room is in outlying position, the sum of the lengths of the first room end wall and the room side wall being substantially equal to the length of the trailer side wall between the first room end wall hinge and the first trailer end wall so that the second room end wall overlies said first trailer end wall when the first room end wall and the room side wall are parallel to the trailer side wall.

2. In a house trailer comprising at least one side wall, a first trailer end wall disposed at right angles to one end of said side wall and a roof fixedly secured to the top of said walls, an outlying room having a side wall and substantially equal length first and second room end wells, hinge means securing one vertical edge of the first room end wall to a side wall of the trailer, hinge means securing the other vertical edge of the first room end wall to one vertical edge of the room side wall, the other end of the room side wall being rigidly connected to one edge of the second room end wall in substantially right angular relation thereto, means on the free vertical edge of the second room end wall releasably securing said end wall to the trailer side wall when said room is in outlying position, the sum of the lengths of the first room end wall and the room side wall being substantially equal to the length of the trailer side wall between the first room end wall hinge and the first trailer end wall so that the second room end wall overlies said first trailer end wall when the first room end wall and the room side wall are parallel to the trailer side wall, track means on the trailer roof disposed substantially parallel to said first trailer end wall, a room roof panel slidably secured to said track means, and rail means on the room end walls alined with said track means onto which the room roof panel can be slid when the room side and end walls are in outlying room position.

3. In a house trailer comprising at least one side wall, a first trailer end wall disposed at right angles to one end of said side wall and a roof fixedly secured to the top of said walls, an outlying room having a side wall and substantially equal length first and second room end walls, hinge means securing one vertical edge of the first room end wall to a side wall of the trailer, hinge means securing the other vertical edge of the first room end wall to one vertical edge of the room side wall, the other end of the room side wall being rigidly connected to one edge of the second room end wall in substantially right angular relation thereto, means on the free vertical edge of the second room end wall releasably securing said end wall to the trailer side wall when said room is in outlying position, the sum of the lengths of the first room end wall and the room side wall being substantially equal to the length of the trailer side wall between the first room end wall hinge and the first trailer end wall so that the second room end wall overlies said first trailer end wall when the first room end wall and the room side wall are parallel to the trailer side wall, track means on the trailer roof disposed substantially parallel to said first trailer end wall, a room roof panel slidably secured to said track means, rail means on the room end walls alined with said track means onto which the room roof panel can be slid when the room side and end walls are in outlying room position, and a panel pivoted to said side wall of the trailer to be swung downwardly to a horizontal position within the periphery of the room walls to form the floor thereof.

4. In a house trailer comprising at least one side wall, a first trailer end wall disposed at right angles to one end of said side wall and a roof fixedly secured to the top of said walls, an outlying room having a side wall and substantially equal length first and second room end walls, hinge means securing one vertical edge of the first room end wall to a side wall of the trailer, hinge means securing the other vertical edge of the first room end wall to one vertical edge of the room side wall, the other end of the room side wall being rigidly connected to one edge of the second room end wall in substantially right angular relation thereto, means on the free vertical edge of the second room end wall releasably securing said end wall to the trailer side wall when said room is in outlying position, the sum of the lengths of the first room end wall and the room side wall being substantially equal to the length of the trailer side wall between the first room end wall hinge and the first trailer end wall so that the second room end wall overlies said first trailer end wall when the first room end wall and the room side wall are parallel to the trailer side wall, a floor panel pivoted to said side wall of the trailer in position to swing downwardly and be supported in horizontal position within the periphery of the room walls, a room roof panel, track means mounted on said trailer roof disposed substantially parallel to said first trailer wall, means on the room roof panel slidably supporting the panel on said track means, rail means on the top of the room end walls, and means for raising said rail means into alignment with the track means to permit the room roof panel to be slid therefrom onto said rail means, said raising means also serving to lower said rail means and said roof panel into operative position on the outlying room.

References Cited by the Examiner

UNITED STATES PATENTS

| | | | |
|---|---|---|---|
| 2,132,409 | 10/1938 | Gedeon | 296—23 |
| 2,368,936 | 2/1945 | McGehee | 20—2 X |
| 2,765,497 | 10/1956 | Ludowici | 20—2 |
| 2,858,581 | 11/1958 | Doane | 20—2 |

FRANK L. ABBOTT, *Primary Examiner.*

WILLIAM I. MUSHAKE, EARL J. WITMER, JACOB L. NACKENOFF, *Examiners.*